US012253747B2

(12) United States Patent
Fang et al.

(10) Patent No.: US 12,253,747 B2
(45) Date of Patent: Mar. 18, 2025

(54) VIEWING ANGLE CONTROL MODULE AND DISPLAY APPARATUS

(71) Applicant: Coretronic Corporation, Hsin-Chu (TW)

(72) Inventors: Chung-Yang Fang, Hsin-Chu (TW); Wen-Chun Wang, Hsin-Chu (TW); Bo-Han Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/362,971

(22) Filed: Aug. 1, 2023

(65) Prior Publication Data

US 2024/0045243 A1 Feb. 8, 2024

Related U.S. Application Data

(60) Provisional application No. 63/394,638, filed on Aug. 3, 2022.

(30) Foreign Application Priority Data

Sep. 29, 2022 (CN) .......................... 202211199404.9

(51) Int. Cl.
*G02F 1/13* (2006.01)
*G02F 1/133* (2006.01)
(Continued)

(52) U.S. Cl.
CPC ........ *G02F 1/1323* (2013.01); *G02F 1/13306* (2013.01); *G02F 1/133531* (2021.01); *G02F 1/133638* (2021.01); *G02F 1/133746* (2021.01); *G02F 1/134309* (2013.01); *G02F 1/1347* (2013.01)

(58) Field of Classification Search
CPC ............ G02F 1/1323; G02F 1/133431; G02F 1/1347; G02F 1/13471
See application file for complete search history.

(56) References Cited

U.S. PATENT DOCUMENTS

2017/0257622 A1* 9/2017 Seifert .................... G02B 30/31
2019/0384082 A1* 12/2019 Osterman .............. H04N 23/75
2020/0218101 A1* 7/2020 Ihas ...................... G02B 6/0053

FOREIGN PATENT DOCUMENTS

CN 105487309 4/2016
CN 112987350 A * 6/2021 ........... G02F 1/1323

* cited by examiner

*Primary Examiner* — Jessica M Merlin
(74) *Attorney, Agent, or Firm* — JCIPRNET

(57) ABSTRACT

The disclosure provides a viewing angle control module including a first liquid crystal panel, a first polarizer, a second polarizer, and a phase retarder. The first liquid crystal panel includes a first substrate, a second substrate, a first alignment layer, a second alignment layer, a first liquid crystal layer, a first electrode layer, and a second electrode layer. A second alignment direction of the second alignment layer is antiparallel to a first alignment direction of the first alignment layer. The first electrode layer has multiple electrode patterns arranged at intervals along a first direction and extending along a second direction. A first absorption axis of the first polarizer is perpendicular to a second absorption axis of the second polarizer. An included angle between the first absorption axis and the first alignment direction is 45 degrees. A display apparatus including the viewing angle control module is also provided.

6 Claims, 8 Drawing Sheets

(51) Int. Cl.
*G02F 1/1335* (2006.01)
*G02F 1/13363* (2006.01)
*G02F 1/1337* (2006.01)
*G02F 1/1343* (2006.01)
*G02F 1/1347* (2006.01)

VIEWING ANGLE CONTROL MODULE AND DISPLAY APPARATUS

CROSS-REFERENCE TO RELATED APPLICATION

This application claims the priority benefits of U.S. provisional application Ser. No. 63/394,638, filed on Aug. 3, 2022 and China application serial no. 202211199404.9, filed on Sep. 29, 2022. The entirety of the above-mentioned patent application is hereby incorporated by reference herein and made a part of this specification.

BACKGROUND

Technical Field

The disclosure relates to a display technology, and more particularly, to a viewing angle control module and a display apparatus.

Description of Related Art

As far as the current display technology is concerned, the stereoscopic display technology may be substantially divided into a stereoscopic display technology in which an observer needs to wear specially designed glasses for viewing, and an auto-stereoscopic display technology for direct naked-eye viewing. The two display technologies are nothing more than the use of blocking or deflecting light to project the left-eye image and the right-eye image to the viewer's left eye and right eye respectively, so as to generate the visual effect of the stereoscopic image. In the above auto-stereoscopic display technology, the display pixels of the display panel are divided into left-eye pixels and right-eye pixels to display the left-eye image and the right-eye image respectively. Therefore, the resolution of the presented stereoscopic image will be lower than the original resolution of the display panel.

In addition, the alignment of pixel-size level is required to be performed on the left/right-eye pixels and the light splitting structures, such as the barrier-type or lenticular type light splitting structure, to achieve a better light splitting effect. Therefore, the difficulty of alignment between the display panel and the light splitting structures is increased. If the alignment is not accurate, the left/right-eye image will be misaligned, resulting in image crosstalk, which will seriously affect the visual effect of the stereoscopic image. On the other hand, interference bright and dark patterns (i.e., moiré patterns) between the periodic structures are easily formed between the periodically arranged light splitting structures and the pixel array of the display panel, which affects the display quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a viewing angle control module, in which viewing angles of different zones are controlled independently of one another, and selection of a viewing angle light adapted to block the zones is also extremely convenient.

The disclosure provides a display apparatus with high display resolution of a stereoscopic image, better process flexibility, and good stereoscopic display effect.

Other objectives and advantages of the disclosure may be further understood from the technical features disclosed herein.

In order to achieve one, a part, or all of the above objectives or other objectives, an embodiment of the disclosure provides a viewing angle control module. The viewing angle control module includes a first liquid crystal panel, a first polarizer, a second polarizer, and a phase retarder. The first liquid crystal panel includes a first substrate, a second substrate, a first alignment layer, a second alignment layer, a first liquid crystal layer, a first electrode layer, and a second electrode layer. The first substrate and the second substrate are overlapped with each other. The first alignment layer is disposed on the first substrate and has a first alignment direction. The second alignment layer is disposed on the second substrate and has a second alignment direction. The second alignment direction is antiparallel to the first alignment direction. The first liquid crystal layer is sandwiched between the first alignment layer and the second alignment layer. The first electrode layer is disposed between the first alignment layer and the first substrate. The first electrode layer has multiple electrode patterns. The electrode patterns are arranged at intervals along a first direction and extend along a second direction. The second direction intersects the first direction. The second electrode layer are disposed between the second alignment layer and the second substrate. The first polarizer is disposed on one side of the first substrate away from the first liquid crystal layer and has a first absorption axis. An included angle between the first alignment direction and an axial direction of the first absorption axis is 45 degrees. A second polarizer is disposed on one side of the second substrate away from the first liquid crystal layer and has a second absorption axis. An axial direction of the second absorption axis is perpendicular to the axial direction of the first absorption axis. The phase retarder is disposed between the first polarizer and the first liquid crystal panel.

In order to achieve one, a part, or all of the above objectives or other objectives, an embodiment of the disclosure provides a display apparatus. The display apparatus includes a display panel and a viewing angle control module. The viewing angle control module is disposed on one side of a display surface of the display panel, and includes a first liquid crystal panel, a first polarizer, a second polarizer, and a phase retarder. The first liquid crystal panel includes a first substrate, a second substrate, a first alignment layer, a second alignment layer, a first liquid crystal layer, a first electrode layer, and a second electrode layer. The first substrate and the second substrate are overlapped with each other. The first alignment layer is disposed on the first substrate and has a first alignment direction. The second alignment layer is disposed on the second substrate and has a second alignment direction. The second alignment direction is antiparallel to the first alignment direction. The first liquid crystal layer is sandwiched between the first alignment layer and the second alignment layer. The first electrode layer is disposed between the first alignment layer and the first substrate. The first electrode layer has multiple electrode patterns. The electrode patterns are arranged at intervals along a first direction and extend along a second direction. The second direction intersects the first direction.

The second electrode layer is disposed between the second alignment layer and the second substrate. The first polarizer is disposed on one side of the first substrate away from the first liquid crystal layer and has a first absorption axis. An included angle between the first alignment direction and an axial direction of the first absorption axis is 45 degrees. The second polarizer is disposed on one side of the second substrate away from the first liquid crystal layer and has a second absorption axis. An axial direction of the second absorption axis is perpendicular to the axial direction of the first absorption axis. The phase retarder is disposed between the first polarizer and the first liquid crystal panel.

Based on the above, in the display apparatus according to the embodiment of the disclosure, the viewing angle control module may use the electrode patterns arranged along the direction to individually control the viewing angle of light adapted to block the zones defined by the electrode patterns, so as to generate a specific field of view. The effect of stereoscopic display is achieved by switching the field of view in the time sequence. In addition to using the full resolution of the display panel to present the stereoscopic image, there is no need to perform the alignment of pixel-size level in the process of assembling the viewing angle control module and the display panel, thereby improving the process flexibility of the display apparatus.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
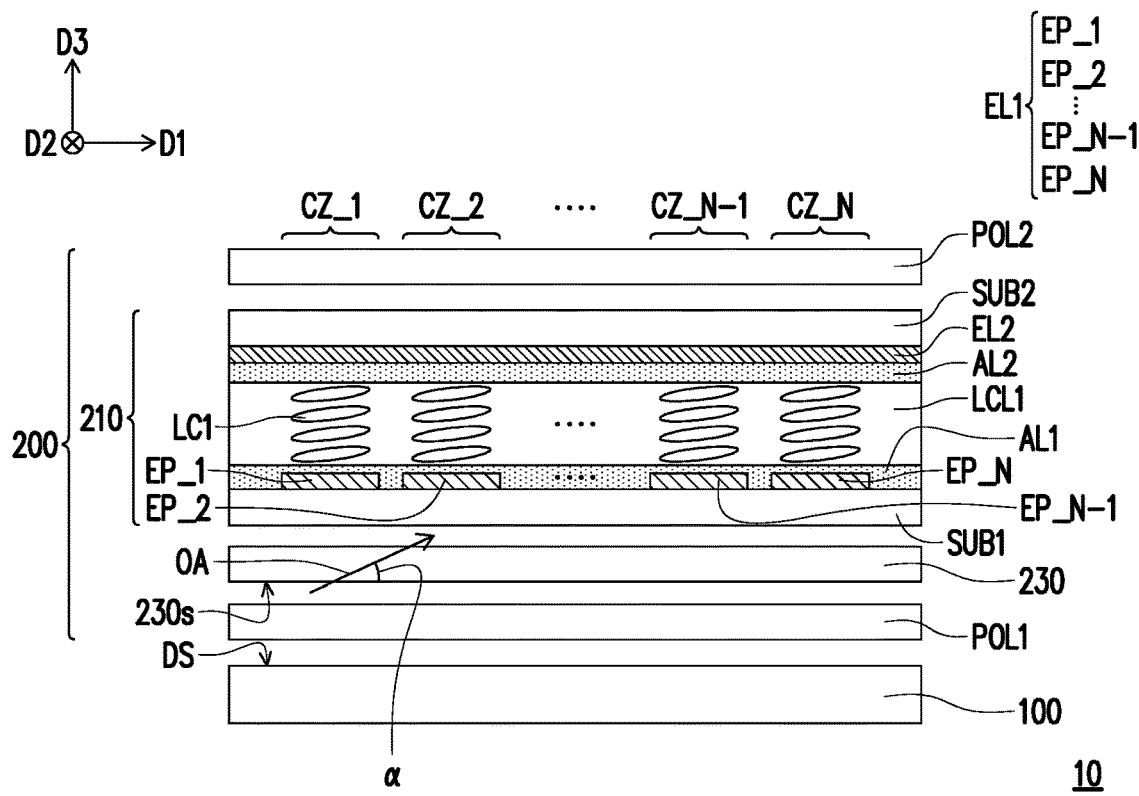
FIGS. 1A and 1B are schematic cross-sectional views of a display apparatus according to the first embodiment of the disclosure in operation modes in different time intervals.
Figure 1B:
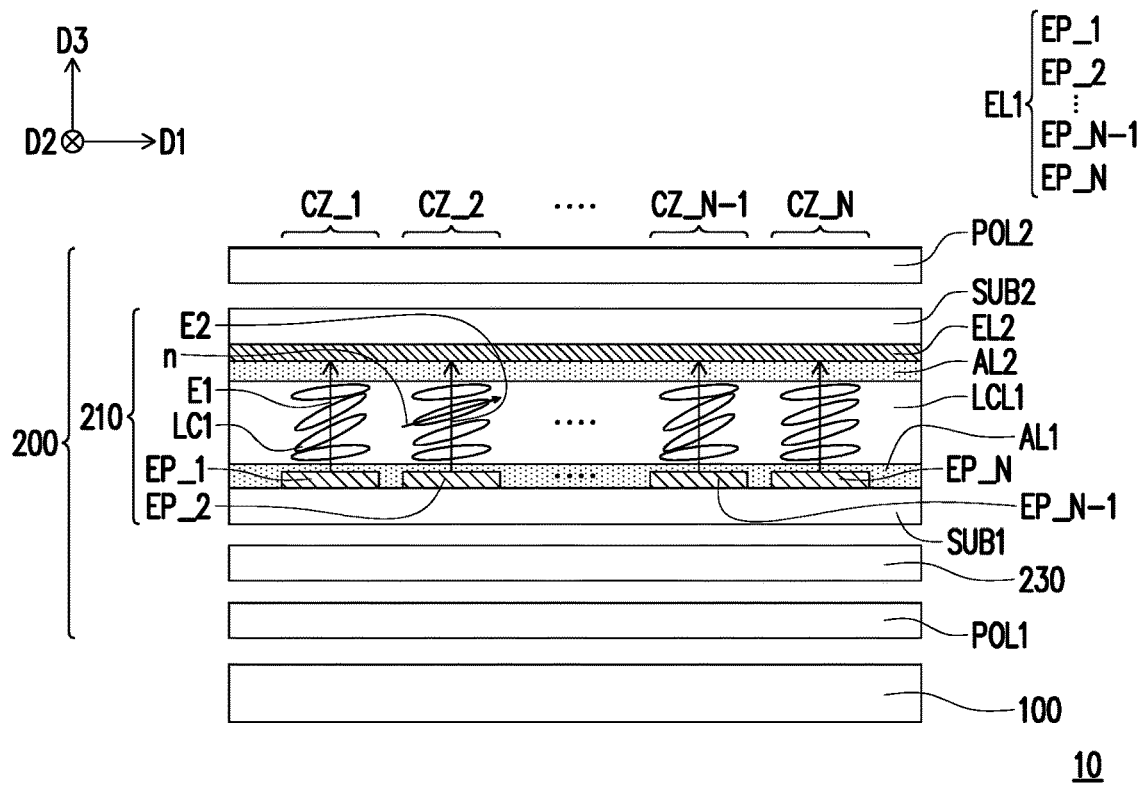
Figure 2:
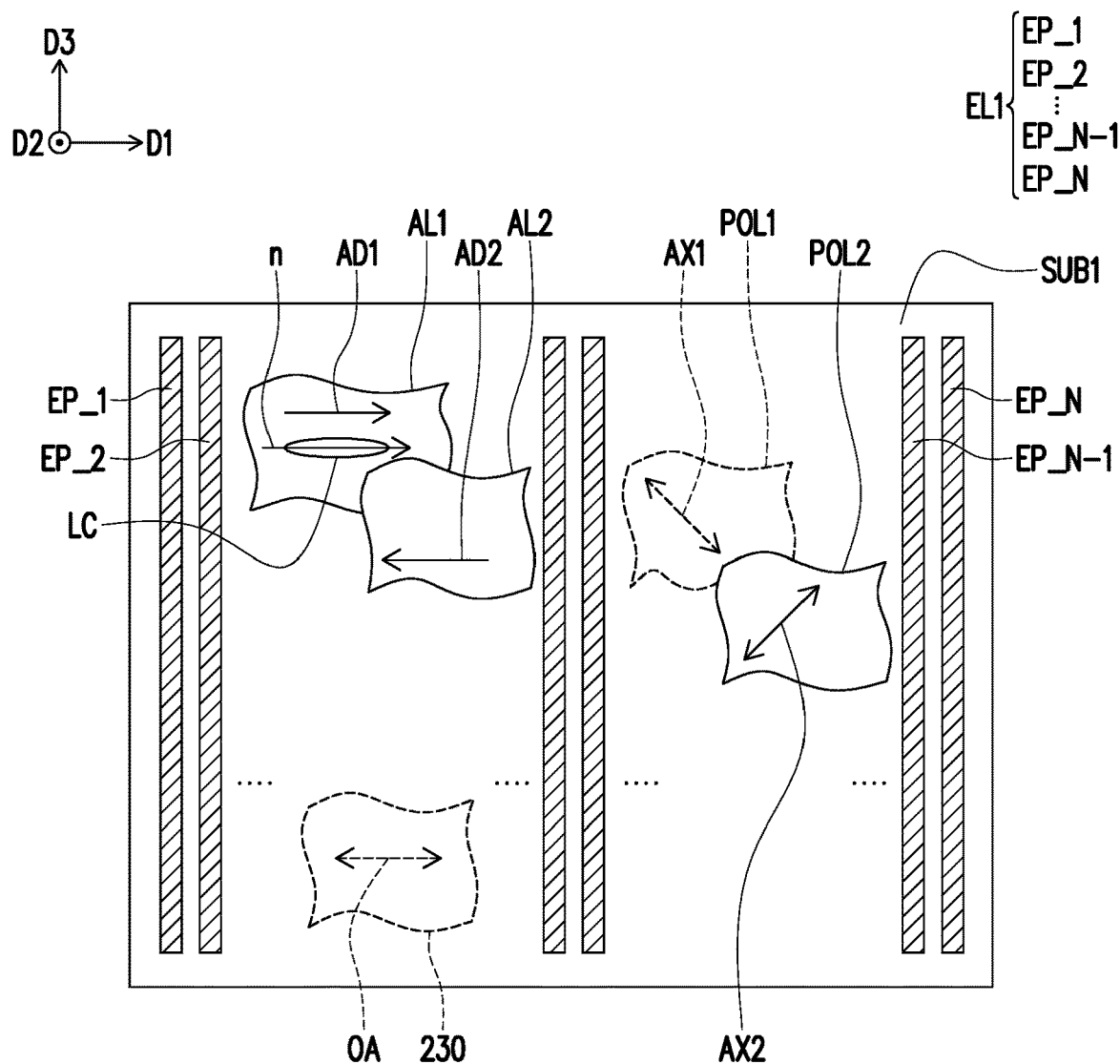
FIG. 2 is a schematic top view of the display apparatus in FIG. 1A.
Figure 3:
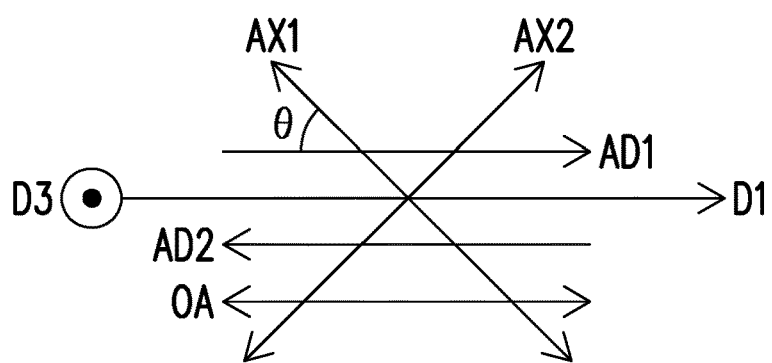
FIG. 3 is a schematic view of a relationship among an absorption axis of a polarizer, an alignment direction of an alignment layer, and an axial direction of an optical axis of a phase retarder in FIG. 2.
Figure 4A:
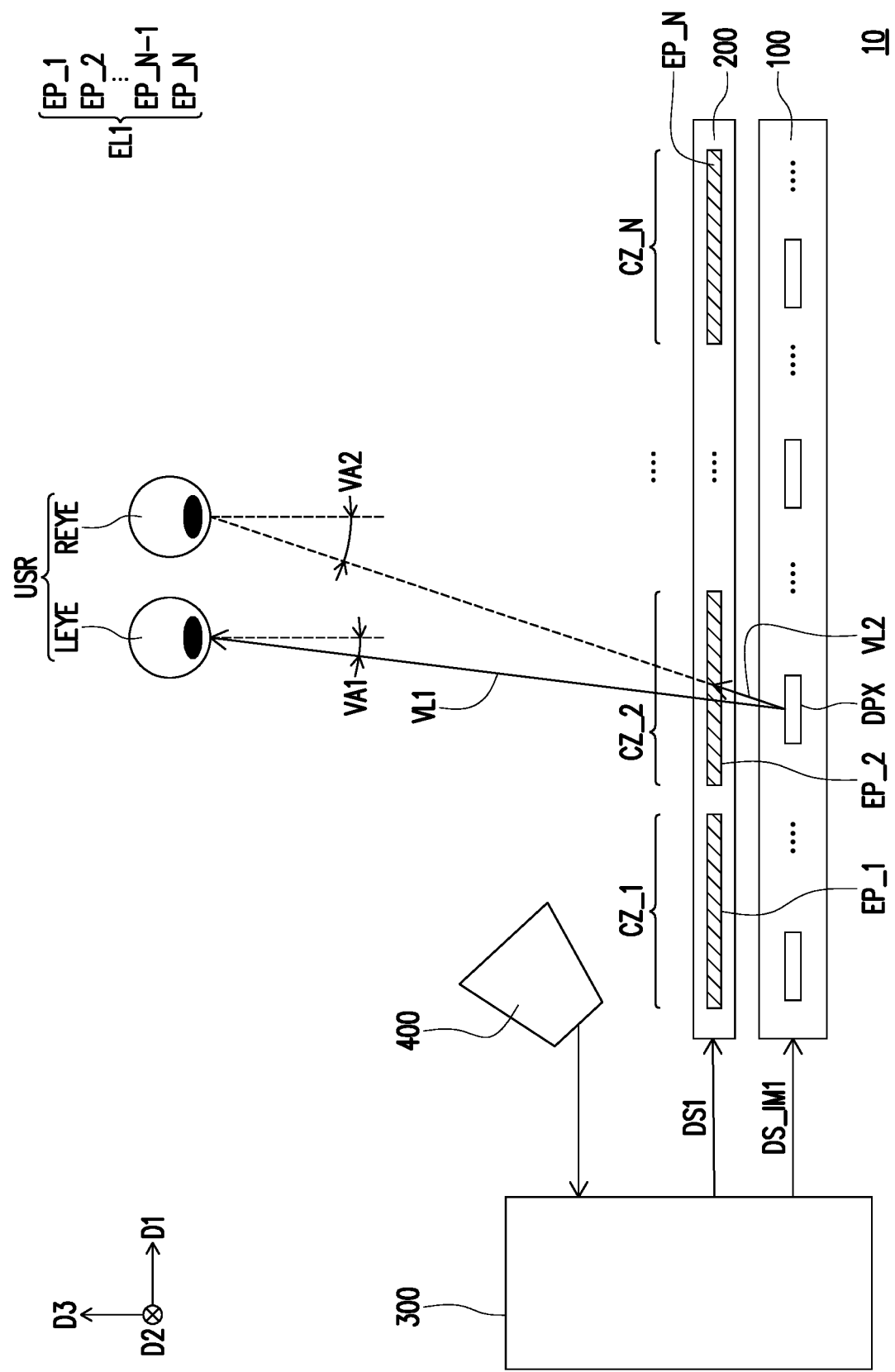
FIGS. 4A and 4B are schematic views of the display apparatus operating in different time intervals respectively according to the first embodiment of the disclosure.
Figure 4B:
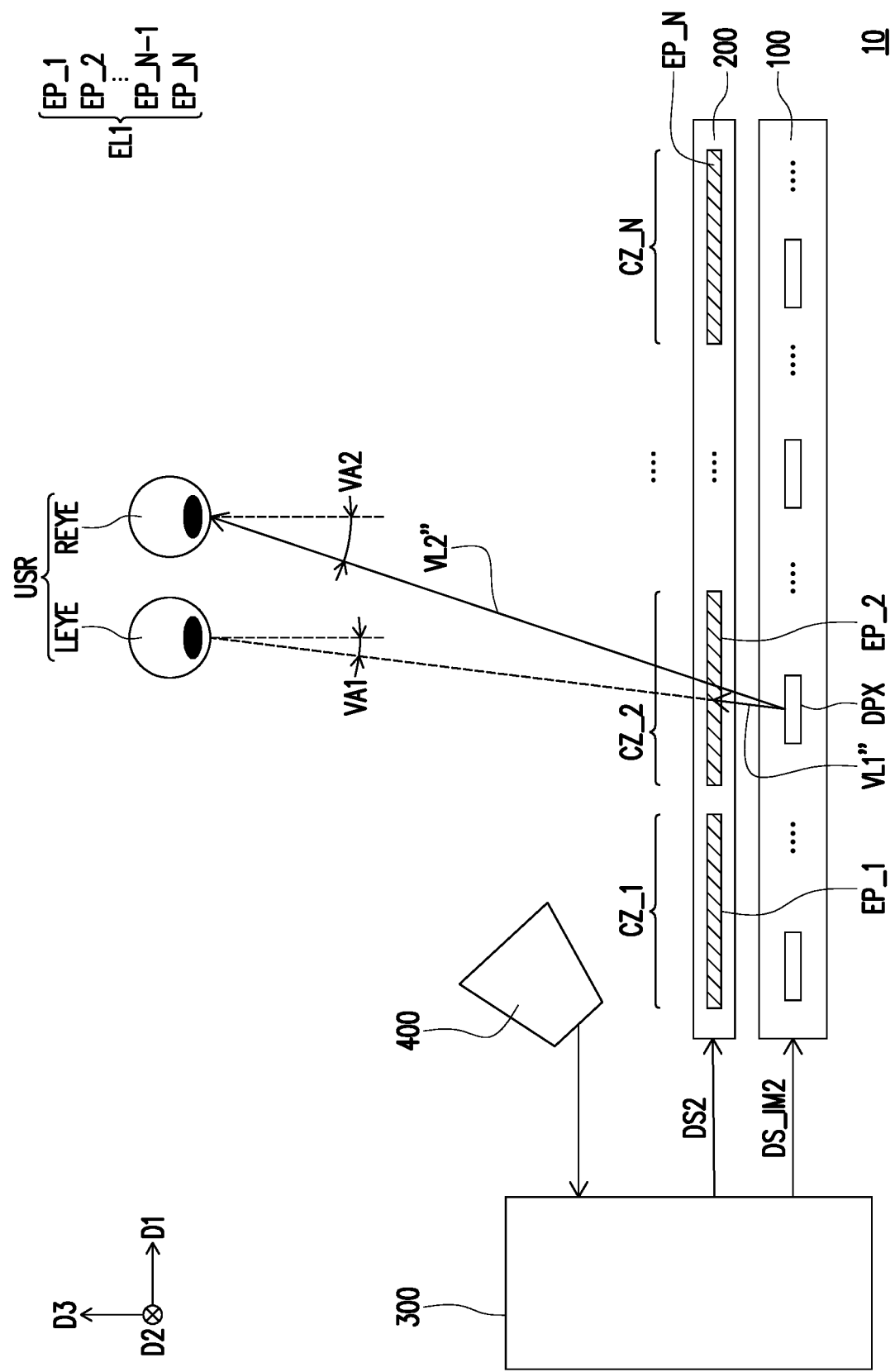
Figure 5:
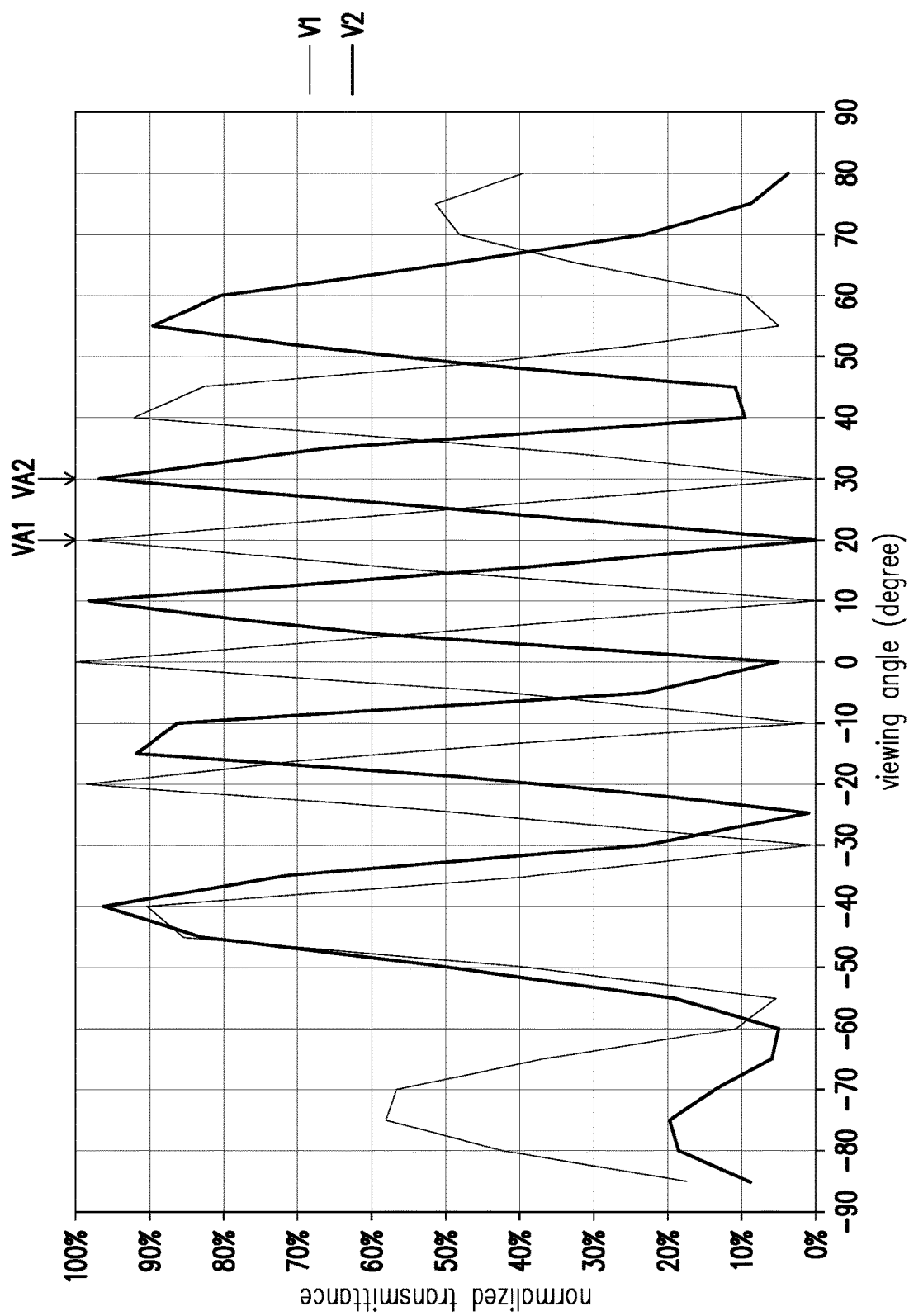
FIG. 5 is a schematic diagram of distribution of a normalized transmittance versus a viewing angle in a second viewing angle control zone in FIGS. 4A and 4B.
Figure 6:
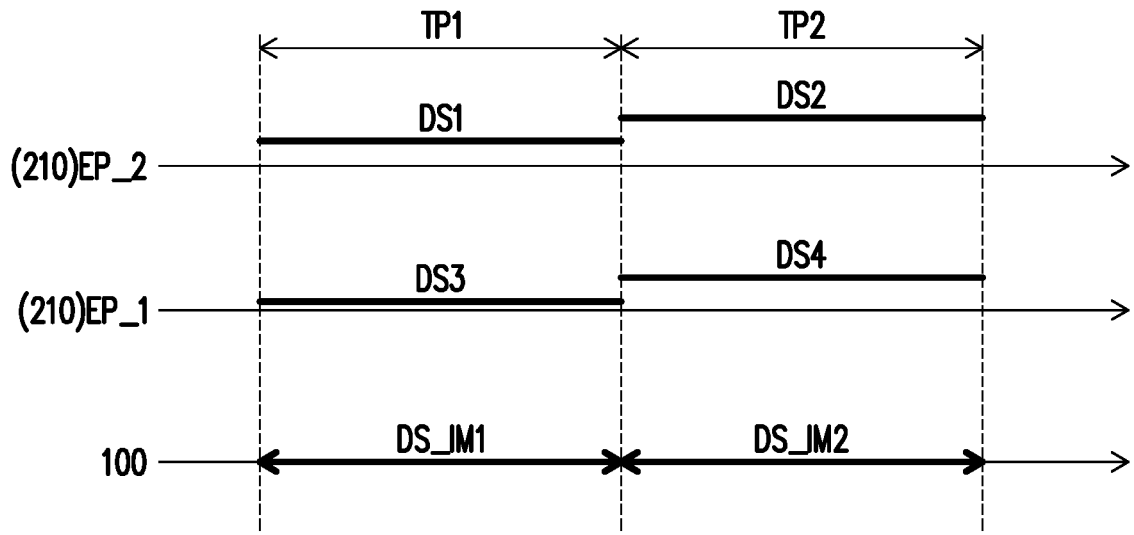
FIG. 6 is a schematic diagram of a driving signal waveform of each of elements of the display apparatus in FIGS. 4A and 4B.
Figure 7:
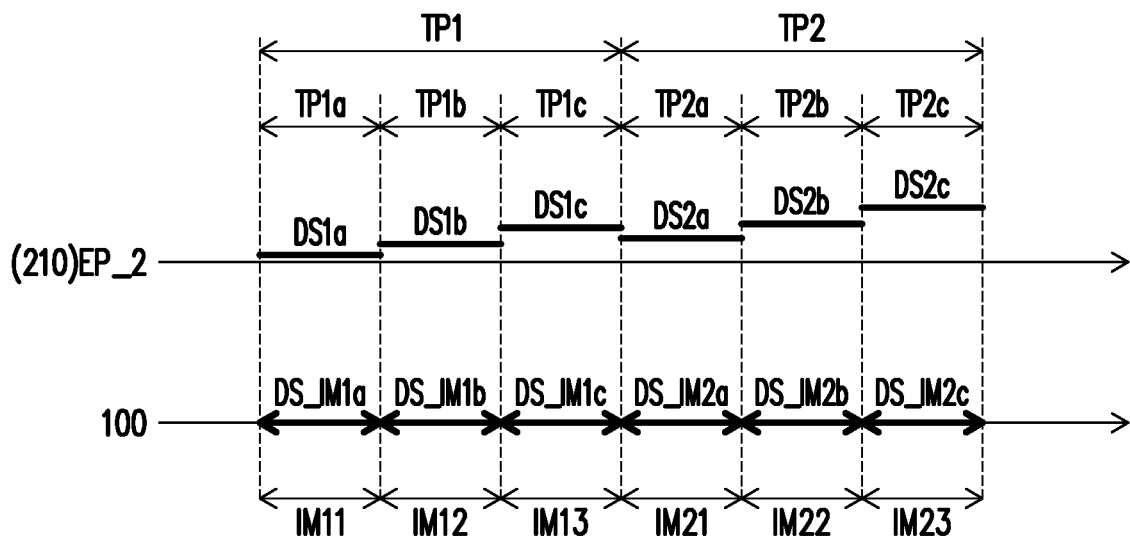
FIG. 7 is a schematic diagram of another driving signal waveform of each of the elements of the display apparatus in FIGS. 4A and 4B.

FIGS. 1A and 1B are schematic cross-sectional views of a display apparatus according to the first embodiment of the disclosure in operation modes in different time intervals. FIG. 2 is a schematic top view of the display apparatus in FIG. 1A. FIG. 3 is a schematic view of a relationship among an absorption axis of a polarizer, an alignment direction of an alignment layer, and an axial direction of an optical axis of a phase retarder in FIG. 2. FIGS. 4A and 4B are schematic views of the display apparatus operating in different time intervals respectively according to the first embodiment of the disclosure. FIG. 5 is a schematic diagram of distribution of a normalized transmittance versus a viewing angle in a second viewing angle control zone in FIGS. 4A and 4B. FIG. 6 is a schematic diagram of a driving signal waveform of each of elements of the display apparatus in FIGS. 4A and 4B. FIG. 7 is a schematic diagram of another driving signal waveform of each of the elements of the display apparatus in FIGS. 4A and 4B.

Referring to FIGS. 1A, 2, and 3, a display apparatus 10 includes a display panel 100 and a viewing angle control module 200. The viewing angle control module 200 is disposed on one side of a display surface DS of the display panel 100 and overlaps the display surface DS. For example, the viewing angle control module 200 is directly disposed (directly in contact with) on the display panel 100. In this embodiment, the display panel 100 may be a self-luminous display (e.g., a micro light-emitting diode display panel, an organic light-emitting diode display panel, or a mini light-emitting diode display panel) or a non-self-luminous display (e.g., a liquid crystal display panel).

The viewing angle control module 200 includes a first polarizer POL1, a second polarizer POL2, a first liquid crystal panel 210, and a phase retarder 230. The first liquid crystal panel 210 and the phase retarder 230 are disposed between the first polarizer POL1 and the second polarizer POL2. The phase retarder 230 is disposed between the first polarizer POL1 and the first liquid crystal panel 210, but the disclosure is not limited thereto. In other embodiments, the phase retarder 230 may be disposed between the second polarizer POL2 and the first liquid crystal panel 210. The first liquid crystal panel 210 includes a first substrate SUB1, a second substrate SUB2, a first alignment layer AL1, a second alignment layer AL2, a first liquid crystal layer LCL1, a first electrode layer EL1, and a second electrode layer EL2. The first substrate SUB1 and the second substrate SUB2 may be overlapped each other along a direction D3, and the direction D3 is, for example, a direction parallel to a normal of the display surface DS. The first polarizer POL1 is located on one side of the first substrate SUB1 away from the first liquid crystal layer LCL1. For example, the first polarizer POL1 is located between the first substrate SUB1 and the display panel 100. The second polarizer POL2 is located on one side of the second substrate SUB2 away from the first liquid crystal layer LCL1. For example, the second substrate SUB2 is located between the second polarizer POL2 and the first liquid crystal layer LCL1. Specifically, if an outermost side of the display panel 100 already includes a polarizer (linear polarizer), the first polarizer POL1 and the polarizer of the display panel 100 may optionally be the same polarizer. In other words, the polarizer of the display panel 100 may be regarded as the first polarizer POLL.

The first alignment layer AL1 and the second alignment layer AL2 are disposed on the first substrate SUB1 and the second substrate SUB2 respectively, and have a first alignment direction AD1 and a second alignment direction AD2 respectively. The first liquid crystal layer LCL1 is sandwiched between the first alignment layer AL1 and the second alignment layer AL2, and includes multiple liquid crystal molecules LC1. In this embodiment, the first alignment direction AD1 of the first alignment layer AL1 may be antiparallel to the second alignment direction AD2 of the second alignment layer AL2.

The first electrode layer EL1 is disposed between the first alignment layer AL1 and the first substrate SUB1. The second electrode layer EL2 is disposed between the second alignment layer AL2 and the second substrate SUB2. It is particularly noted that the first electrode layer EL1 has multiple electrode patterns, such as an electrode pattern EP_1, an electrode pattern EP_2, . . . , an electrode pattern EP_N−1, and an electrode pattern EP_N. The electrode patterns are arranged at intervals along a direction D1 (i.e., a first direction) and extend along a direction D2 (i.e., a second direction). The direction D1 and the direction D2 are parallel to the display surface DS, and the direction D1 intersects (e.g., perpendicular) the direction D2. In a display area, the second electrode layer EL2 is a full-surface electrode (e.g., an unpatterned electrode layer), and an orthographic projection of the first electrode layer EL1 on the first substrate SUB1 is located within an orthographic projection of the second electrode layer EL2 on the first substrate SUB1.

More specifically, orthographic projection outlines of the multiple electrode patterns on the first substrate SUB1 are each elongated and electrically separated from one another. However, the disclosure is not limited thereto. In this embodiment, the multiple electrode patterns may define multiple viewing angle control zones of the viewing angle control module 200, such as a viewing angle control zone CZ_1, a viewing angle control zone CZ_2, a viewing angle control zone CZ_N−1, and a viewing angle control zone CZ_N in FIG. 1A respectively corresponding to the electrode pattern EP_1, the electrode pattern EP_2, . . . , the electrode pattern EP_N−1, and the electrode pattern EP_N. The first electrode layer EL1 and the second electrode layer EL2 are, for example, transparent conductive layers, and materials of the transparent conductive layers may include metal oxides, such as indium tin oxide, indium zinc oxide, aluminum tin oxide, aluminum zinc oxide, other suitable oxides, or a stack layer of at least two of the above.

On the other hand, the first alignment direction AD1 of the first alignment layer AL1 and the second alignment direction AD2 of the second alignment layer AL2 are parallel to an arrangement direction (e.g., the direction D1) of the electrode patterns EP_1 to EP_N. That is to say, when the two electrode layers are disabled (for example, there is no voltage difference between the two electrode layers), orthographic projections of respective optical axes n (as shown in FIG. 2) of the liquid crystal molecules LC1 of the first liquid crystal layer LCL1 on the first substrate SUB1 are substantially parallel to the arrangement direction of the electrode patterns of the first electrode layer EL1. However, the disclosure is not limited thereto. In other embodiments that are not shown, the first alignment direction of the first alignment layer and the second alignment direction of the second alignment layer may also be perpendicular to the arrangement direction of the electrode patterns of the first electrode layer.

A phase retardation of the first liquid crystal layer LCL1 may range from 0.075 µm to 2.025 µm. In other embodiment, the phase retardation of the first liquid crystal layer LCL1 ranges from 0.3 µm to 1.4 µm. In other embodiment, the phase retardation of the first liquid crystal layer LCL1 ranges from 0.5 µm to 1.05 µm. In this embodiment, a material of the first liquid crystal layer LCL1 is, for example, positive liquid crystals, but the disclosure is not limited thereto. In other embodiments, the material of the first liquid crystal layer LCL1 may also be negative liquid crystals. Specifically, in this embodiment, the phase retardation of the first liquid crystal layer LCL1 is equal to a liquid crystal birefringence (e.g., difference between the extraordinary refractive index and the ordinary refractive index, $\Delta n$) of the first liquid crystal layer LCL1 multiplied by a thickness of the first liquid crystal layer LCL1.

The first polarizer POL1 and the second polarizer POL2 respectively have a first absorption axis AX1 and a second absorption axis AX2 with axial directions perpendicular to each other. It is particularly noted that an included angle $\theta$ between the first absorption axis AX1 of the first polarizer POL1 and the first alignment direction AD1 of the first alignment layer AL1 is 45 degrees.

In this embodiment, the phase retarder 230 is, for example, a phase compensation film, and an orthographic projection of an optical axis OA of the phase compensation film on the first substrate SUB1 is parallel to the alignment direction (e.g., the direction D1) of the alignment layer. A phase retardation of the phase compensation film may range from 0.45 μm to 4.75 μm, and an included angle α between the optical axis OA of the phase compensation film and a film surface 230s of the phase compensation film facing the first polarizer POL1 ranges from 26 degrees to 36 degrees. In other embodiment, the phase retardation of the phase compensation film ranges from 0.6 μm to 4.0 μm, and the included angle α ranges from 29 degrees to 33 degrees. In other embodiment, the phase retardation of the phase compensation film ranges from 1.3 μm to 3.0 μm. Specifically, in this embodiment, the phase retardation of the phase compensation film is equal to a birefringence (e.g., difference between the extraordinary refractive index and the ordinary refractive index, Δn) of a phase compensation film material multiplied by a thickness of the phase compensation film.

In this embodiment, respective applied electric potentials of the electrode patterns of the first electrode layer EL1 may be different. That is, the electrode patterns may be individually controlled. For example, as shown in FIG. 1B, the electric potential applied to the electrode pattern EP_1 may be greater than the electric potential applied to the electrode pattern EP_2. Since the liquid crystal molecules LC1 in this embodiment are positive liquid crystals, when an electric field is large enough, the optical axes n of the liquid crystal molecules LC1 tends to be arranged along a direction of the electric field. Therefore, an electric field E1 generated between the electrode pattern EP_1 and the second electrode layer EL2 is greater than an electric field E2 generated between the electrode pattern EP_2 and the second electrode layer EL2. As a result, a rotation angle of the liquid crystal molecules LC1 of the first liquid crystal layer LCL1 in the viewing angle control zone CZ_1 is greater than a rotation angle of the liquid crystal molecules LC1 of the first liquid crystal layer LCL1 in the viewing angle control zone CZ_2 (as shown in FIG. 1B).

For example, when voltages (electric potential difference) of 1.5V and 2.4V are applied to the first electrode layer EL1, a relationship of a transmittance of light passing through the viewing angle control module 200 versus different incident angles (i.e. viewing angles, where a viewing angle of 0 degrees is, for example, a front viewing angle) is shown as a curve V1 and a curve V2 in FIG. 5 respectively. According to FIG. 5, when the voltages applied to the first electrode layer EL1 are different (i.e., the electric fields applied to the first liquid crystal layer LCL1 are different), the viewing angles corresponding to a local maximum and a local minimum of the transmittance are different. For example, when the voltage of 1.5V is applied (the curve V1), the viewing angle corresponding to the local maximum value is, for example, 20 degrees and 40 degrees. When the voltage of 2.4V is applied (the curve V2), the viewing angle corresponding to the local maximum value is, for example, 10 degrees and 30 degrees. In this way, by applying different voltages to the first electrode layer EL1 at different times, the light may be controlled to be observed at a viewing angle position (e.g. a left-eye position) in a time interval and not be observed at another viewing angle position (e.g. a right-eye position), and not be observed at the viewing angle position (e.g. the left-eye position) in another time interval and to be observed at the another viewing angle position (e.g. the right-eye position). Specifically, in the disclosure, the viewing angle control module 200 of the display apparatus 10 is provided with the first liquid crystal panel 210 and the phase retarder 230 at the same time. Therefore, the transmittance of the light passing through the viewing angle control module 200 may be greatly increased (for example, a period may be reduced to greater than or equal to 5 degrees and less than or equal to 30 degrees) with a rate of change of changes in the viewing angles. In this way, an issue of crosstalk between two eyes caused by an image being observed by the two eyes of the user at the same time may be avoided. Relatively speaking, if the viewing angle control module only has a liquid crystal panel or the phase retarder, the transmittance of the light passing through the viewing angle control module 200 is relatively moderate (for example, a period may be greater than 60 degrees) with the rate of change of the changes in the viewing angles. In this way, the image may be observed by the two eyes at the same time, and the user may not observe a visual effect of a stereoscopic image.

It should be noted that in FIG. 5, the transmittance corresponding to each of the viewing angles is the transmittance (i.e., a normalized transmittance) normalized by a maximum transmittance that the light may pass through the viewing angle control module 200 when the first liquid crystal layer LCL1 is applied with 1.5V and 2.4V.

Referring to FIGS. 4A and 5, the display apparatus 10 may further include a control unit 300 electrically coupled to the display panel 100 and the viewing angle control module 200. When the control unit 300 provides a driving signal DS1 to any one of the electrode patterns of the first electrode layer EL1 and provides a display driving signal DS_IM1 to the display panel 100 to display a first image at the same time, any one of the viewing angle control zones of the viewing angle control module 200 is adapted to allow a first viewing angle light VL1 from the display panel 100 to pass through and a second viewing angle light VL2 from the display panel 100 not to pass through. The first viewing angle light VL1 is different from the second viewing angle light VL2.

In detail, in this embodiment, the display panel 100 may have multiple display pixels DPX, and the display pixels DPX may be arranged in an array to present a display image. For example, path directions (the viewing angles) of the first viewing angle light VL1 and the second viewing angle light VL2 from the display pixels DPX are, for example, toward a left eye LEYE and a right eye REYE of a user USR respectively. When the voltage of 1.5V is applied to the electrode pattern EP_2, the first viewing angle light VL1 is transmitted to the left eye LEYE of the user USR after passing through the viewing angle control zone CZ_2 defined by the electrode pattern EP_2, and the second viewing angle light VL2 from the same display pixel DPX may not pass through the viewing angle control zone CZ_2 to be received by the right eye REYE of the user USR. An included angle between the path direction of the first viewing angle light VL1 and a frontal direction (e.g., the direction D3) of the user USR may be defined as a first viewing angle VA1, and an included angle between the path direction of the second viewing angle light VL2 and the frontal direction of the user USR may be defined as a second viewing angle VA2. In particular, one electrode pattern may correspond to (cover) one or more display pixels DPX. That is, one viewing angle control zone may include one or more (e.g., greater than 30 and less than 100) display pixels DPX.

For example, the first viewing angle VA1 and the second viewing angle VA2 in FIG. 4A are, for example, 20 degrees and 30 degrees respectively. According to FIG. 5, when the first electrode layer EL1 is applied with the voltage of 1.5V, the normalized transmittance of the viewing angle control module 200 for an incident light with the viewing angle of 20 degrees is the local maximum (as shown by the curve V1). Therefore, the first viewing angle light VL1 may pass through the viewing angle control module 200. On the contrary, the normalized transmittance of the viewing angle control module 200 for the incident light with the viewing angle of 30 degrees is the local minimum (as shown by the curve V1). Therefore, the second viewing angle light VL2 is blocked by the viewing angle control module 200. That is, the driving signal DS1 may have a voltage level of 1.5V.

Referring to FIGS. 4B and 5, when the control unit 300 provides a driving signal DS2 to any one of the electrode patterns of the first electrode layer EL1 and provides a display driving signal DS_IM2 to the display panel 100 to display a second image at the same time, any one of the viewing angle control zones of the viewing angle control module 200 is adapted to allow a second viewing angle light VL2" from the display panel 100 to pass through and a first viewing angle light VL1" from the display panel 100 not to pass through.

For example, the second viewing angle light VL2" from the display pixel DPX is transmitted to the right eye REYE of the user USR after passing through the viewing angle control zone CZ_2, and the first viewing angle light VL1" from the same display pixel DPX may not pass through the viewing angle control zone CZ_2 to be received by the left eye LEYE of the user USR.

According to FIG. 5, when the electrode pattern EP_2 is applied with the voltage of 2.4V, the normalized transmittance of the viewing angle control module 200 for the incident light with the viewing angle of 30 degrees is the local maximum (as shown by the curve V2). Therefore, the second viewing angle light VL2" may pass through the viewing angle control module 200. On the contrary, the normalized transmittance of the viewing angle control module 200 for the incident light with the viewing angle of 20 degrees is the local minimum (as shown by the curve V2). Therefore, the first viewing angle light VL1" is blocked by the viewing angle control module 200. That is, the driving signal DS2 may have a voltage level of 2.4V.

By driving the display apparatus 10 in a sequential manner according to driving methods shown in FIGS. 4A and 4B, the display apparatus 10 may have a stereoscopic display function. Referring to FIGS. 4A, 4B, and 6, for example, an operation sequence of the display apparatus 10 may be divided into multiple time intervals, for example, multiple first time intervals TP1 and multiple second time intervals TP2 alternately configured in a time sequence. During the first time interval TP1, the electrode pattern EP_2 of the first liquid crystal panel 210 receives the driving signal DS1 and has, for example, the voltage of 1.5V, and the display pixels DPX of the display panel 100 receive the display driving signal DS_IM1. During the second time interval TP2, the electrode pattern EP_2 receives the driving signal DS2 and has, for example, the voltage of 2.4V, and the display pixels DPX of the display panel 100 receive the display driving signal DS_IM2.

More specifically, during the first time interval TP1, the left eye LEYE of the user USR may receive the first viewing angle light VL1 from the display panel 100 through the viewing angle control zone CZ_2 and form the first image, and during the second time interval TP2, the right eye REYE of the user USR may receive the second viewing angle light VL2" from the display panel 100 through the viewing angle control zone CZ_2 and form the second image. Therefore, the user USR may generate the visual effect of the stereoscopic image.

Distances between the left eye LEYE or right eye REYE of the user USR and the electrode patterns of the viewing angle control module 200 (the display apparatus 10 is, for example, a flat display) are different (that is, viewing angles of light received by the left eye LEYE or the right eye REYE from different viewing angle control zones are different). Therefore, during the same time interval, the driving signals applied by different electrode patterns are also different, so that the light passing through the viewing angle control zones are respectively received by the left eye LEYE (or the right eye REYE) at different viewing angles. For example, during the first time interval TP1, the electrode pattern EP_1 adjacent to the electrode pattern EP_2 receives a driving signal DS3 different from the driving signal DS1 and has a voltage level different from 1.5V. Therefore, during the first time interval TP1, the viewing angle of light that may pass through the viewing angle control zone CZ_1 defined by the electrode pattern EP_1 is different from the viewing angle of light that may pass through the viewing angle control zone CZ_2, so that the passing light is transmitted to the left eye LEYE. During the second time interval TP2, the electrode pattern EP_1 receives a driving signal DS4 different from the driving signal DS2 and has a voltage level different from 2.4V. Therefore, during the second time interval TP2, the viewing angle of light that may pass through the viewing angle control zone CZ_1 defined by the electrode pattern EP_1 is different from the viewing angle of light that may pass through the viewing angle control zone CZ_2, so that the passing light is transmitted to the right eye REYE.

Therefore, when the display panel 100 displays the first image (that is, during the first time interval TP1) or the second image (that is, during the second time interval TP2), the viewing angle control module 200 may allow the left eye LEYE or the right eye REYE of the user USR to receive the viewing angle light from each of the display pixels DPX through the above driving method. In other words, the left eye LEYE of the user USR may see the first image formed by all the display pixels DPX of the display panel 100 during the first time interval TP1, and the right eye REYE of the user USR may see the second image formed by all the display pixels DPX of the display panel 100 during the second time interval TP2.

Further, in this embodiment, when the first image and the second image are two images with parallax, the user USR may use the first image received by the left eye LEYE and the second image received by the right eye REYE to form stereoscopic vision, and the visual stereoscopic image may be presented by the full resolution of the display panel 100. On the contrary, when the first image and the second image are the same image (that is, the two images do not have parallax), the image felt by the user USR becomes a two-dimensional image that generally does not have a sense of depth.

That is, in this embodiment, the stereoscopic display function of the display apparatus 10 may be switched by controlling presence or absence of the parallax between the first image and the second image displayed by the display panel 100 in different time intervals.

On the other hand, since an operation principle of the viewing angle control module 200 in this embodiment is different from the known barrier-type or lenticular lens light splitting structure, during an assembly process of the display apparatus 10, alignment of pixel-size level is not required to be performed on the display panel 100 and the viewing angle control module 200, which may greatly reduce the difficulty of the assembly process, thereby improving the process flexibility of the display apparatus 10. In addition, interference bright and dark patterns (i.e., moiré patterns) that are common between two periodic structures are not formed between the viewing angle control module 200 and the array of the display pixels DPX of the display panel 100, which helps to improve display quality of the display apparatus 10.

Further, in this embodiment, the display apparatus 10 may optionally include an eye tracking system 400. The eye tracking system 400 is electrically coupled to the control unit 300 and is adapted to detect the positions of the left eye LEYE and the right eye REYE of the user USR. For example, when the display panel 100 displays the first image, the control unit 300 adjusts the driving signal provided to each of the electrode patterns according to the position of the left eye LEYE detected by the eye tracking system 400, so that the light passing through each of the viewing angle control zones may be transmitted to the left eye LEYE, and not transmitted to the right eye REYE. When the display panel 100 displays the second image, the control unit 300 adjusts the driving signal provided to each of the electrode patterns according to the position of the right eye REYE detected by the eye tracking system 400, so that the light passing through each of the view angle control zones may be transmitted to the right eye REYE, and not transmitted to the left eye LEYE.

By using a detection feedback of the eye tracking system 400 and adjusting the driving signal of the viewing angle control module 200 in real time, the user USR may obtain the best stereoscopic viewing experience at any position in a viewing space.

On the other hand, most of the materials forming the first liquid crystal layer LCL1 of the viewing angle control module 200 are color dispersion materials, light of different wavelengths will generate different phase retardations after passing through the first liquid crystal layer LCL1. As a result, the color shift of the displayed image or the crosstalk of the two-eye image is caused.

Referring to FIGS. 4A, 4B, and 7, in order to solve the above issue, the first time interval TP1 and the second time interval TP2 in the operation sequence of the display apparatus 10 may be further divided. For example, display colors of the display pixels DPX of the display panel 100 may include a first color, a second color, and a third color that are different from one another. That is, the first image and the second image may be displayed by the display pixels DPX having different display colors.

In order to allow the light from the display pixels DPX having different display colors generate the same or similar phase retardation after passing through the same viewing angle control zone, each of the time intervals may be further divided into three sub-periods. For example, the first time interval TP1 may be divided into a first sub-period TP1a, a second sub-period TP1b, and a third sub-period TP1c, and the second time interval TP2 may be divided into a first sub-period TP2a, a second sub-period TP2b, and a third sub-period TP2c.

In the first sub-period TP1a, the second sub-period TP1b, and the third sub-period TP1c of the first time interval TP1, the electrode pattern EP_2 receives a driving signal DS1a (i.e., a first driving signal), a driving signal DS1b (i.e., a second driving signal), and a driving signal DS1c (i.e., a third driving signal) from the control unit 300 respectively to have different voltage levels. In the first sub-period TP2a, the second sub-period TP2b, and the third sub-period TP2c of the second time interval TP2, the electrode pattern EP_2 receives a driving signal DS2a (i.e., the first driving signal), a driving signal DS2b (i.e., the second driving signal), and a driving signal DS2c (i.e., the third driving signal) from the control unit 300 respectively to have different voltage levels.

It should be noted that in the first sub-period TP1a of the first time interval TP1, only the display pixels DPX used to display the first color on the display panel 100 receive a display driving signal DS_IM1a and display a first image IM11. In the second sub-period TP1b, only the display pixels DPX used to display the second color on the display panel 100 receive a display driving signal DS_IM1b and display a second image IM12. In the third sub-period TP1c, only the display pixels DPX used to display the third color on the display panel 100 receive a display driving signal DS_IM1c and display a third image IM13. That is, the display colors of the first image IM11, the second image IM12, and the third image IM13 are different from one another.

Similarly, in the first sub-period TP2a of the second time interval TP2, only the display pixels DPX used to display the first color on the display panel 100 receive a display driving signal DS_IM2a and display a first image IM21. In the second sub-period TP2b, only the display pixels DPX used to display the second color on the display panel 100 receive a display driving signal DS_IM2b and display a second image IM22. In the third sub-period TP2c, only the display pixels DPX used to display the third color on the display panel 100 receive a display driving signal DS_IM2c and display a third image IM23. That is, the display colors of the first image IM21, the second image IM22, and the third image IM23 are different from one another.

That is to say, through different sub-periods of each of the time intervals, the control unit 300 adjusts the voltage applied to the electrode pattern of the viewing angle control module 200 according to the color of the image displayed on the display panel 100, so that the phase retardation (or the transmittance) of the light having different colors after passing through the same viewing angle control zone is the same or similar. In particular, if the phase retardation of the first liquid crystal layer LCL1 for wavelengths of some colors (such as the first color and the second color) is not very different or similar, the number of divided sub-periods may also be reduced in each of the time intervals. For example, only the first sub-period (e.g., corresponding to the first color and second color image) and the second sub-period (e.g., corresponding to the third color image) are divided.

Some other embodiments are provided below to describe the disclosure in detail, where the same reference numerals denote the same or like components, and descriptions of the same technical contents are omitted. The aforementioned embodiment may be referred for descriptions of the omitted parts, and detailed descriptions thereof are not repeated in the following embodiment.

Figure 8:
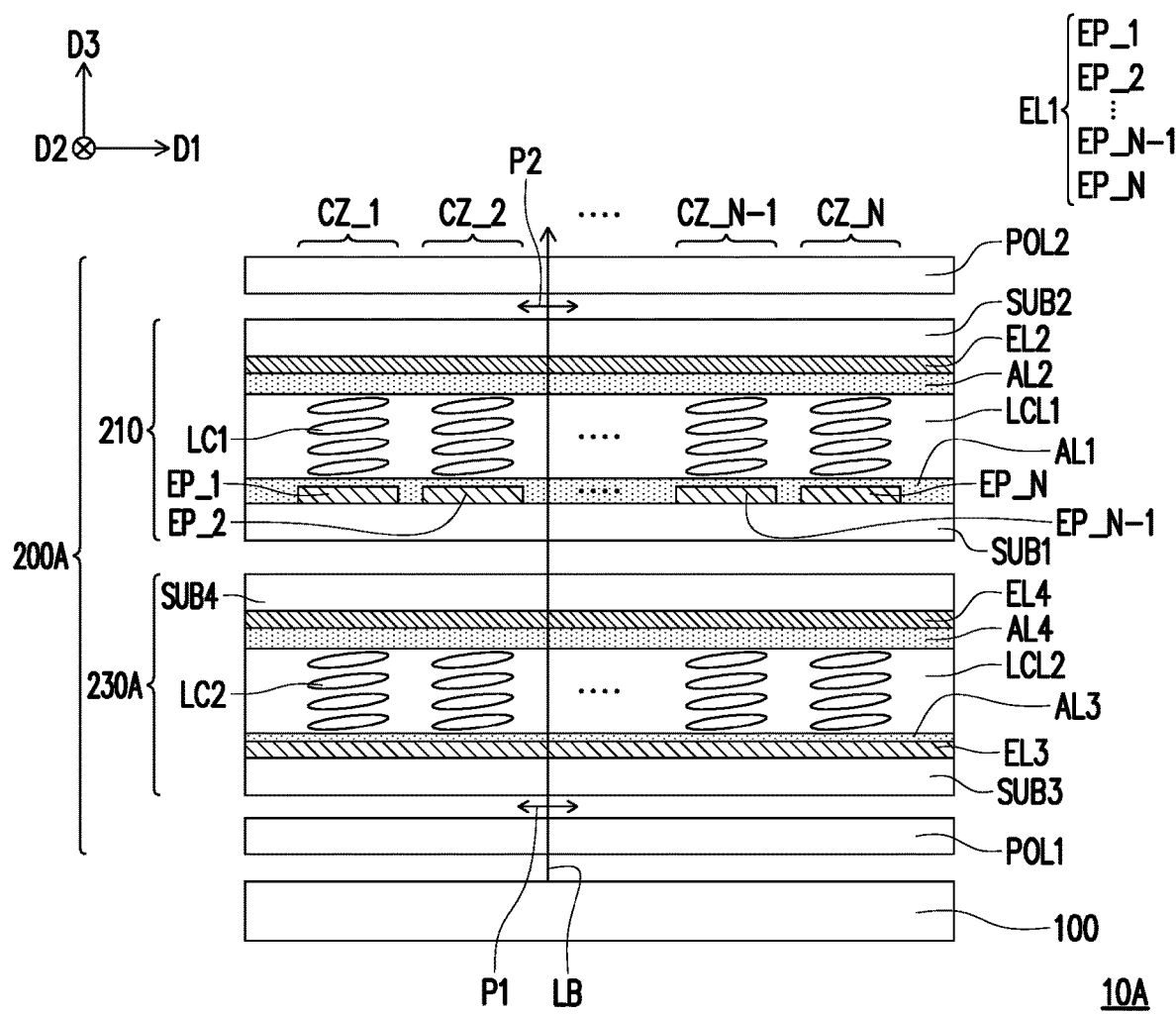
FIG. 8 is a schematic cross-sectional view of a display apparatus according to the second embodiment of the disclosure.
Figure 9:
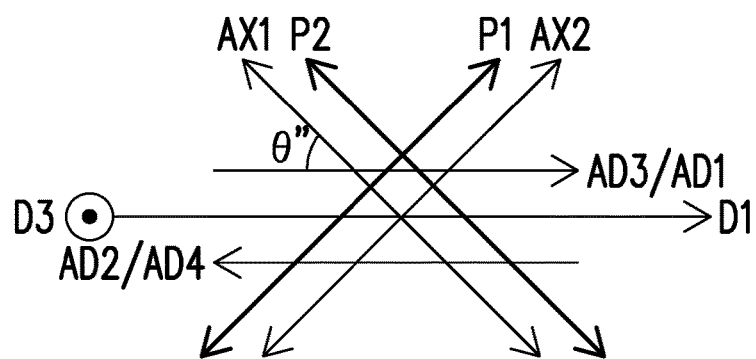
FIG. 9 is a schematic view of a relationship among an absorption axis of a polarizer, an alignment direction of an alignment layer, and a light polarization direction in FIG. 8.
Figure 10:
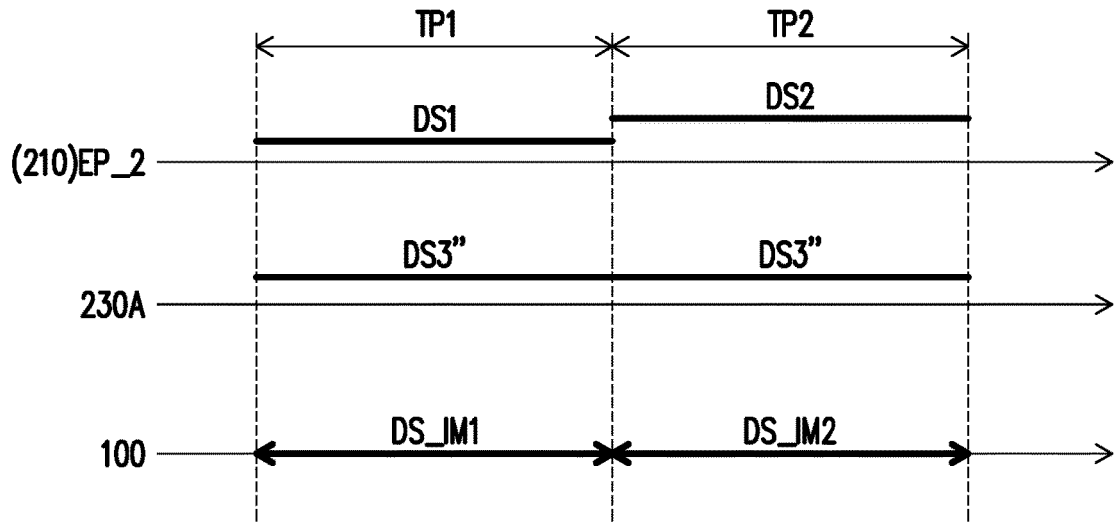
FIG. 10 is a schematic diagram of a driving signal waveform of each of elements of the display apparatus in FIG. 8.

FIG. 8 is a schematic cross-sectional view of a display apparatus according to the second embodiment of the disclosure. FIG. 9 is a schematic view of a relationship among an absorption axis of a polarizer, an alignment direction of an alignment layer, and a light polarization direction in FIG. 8. FIG. 10 is a schematic diagram of a driving signal waveform of each of elements of the display apparatus in FIG. 8. Referring to FIGS. 8 and 9, a difference between a display apparatus 10A in this embodiment and the display apparatus 10 in FIG. 1A is that the phase retarder is different.

Specifically, a phase retarder 230A of a viewing angle control module 200A of the display apparatus 10A is a second liquid crystal panel. In this embodiment, the second liquid crystal panel may include a third substrate SUB3, a fourth substrate SUB4, a third alignment layer AL3, a fourth alignment layer AL4, a second liquid crystal layer LCL2, a third electrode layer EL3, and a fourth electrode layer EL4. The third substrate SUB3 and the fourth substrate SUB4 are overlapped with each other. The third alignment layer AL3 is disposed on the third substrate SUB3 and has a third alignment direction AD3. The fourth alignment layer AL4 is disposed on the fourth substrate SUB4 and has a fourth alignment direction AD4.

In this embodiment, the third alignment direction AD3 of the third alignment layer AL3 may be parallel to the first alignment direction AD1 of the first alignment layer AL1, and the fourth alignment direction AD4 of the fourth alignment layer AL4 may be parallel to the second alignment direction AD2 of the second alignment layer AL2. That is to say, the third alignment direction AD3 of the second liquid crystal panel in this embodiment is also antiparallel to the fourth alignment direction AD4, and an included angle θ" between the third alignment direction AD3 of the third alignment layer AL3 and the first absorption axis AX1 of the first polarizer POL1 is also 45 degrees.

Similar to the first alignment liquid crystal panel 210, the third alignment direction AD3 of the phase retarder 230A (i.e., the second liquid crystal panel) is parallel to the arrangement direction (e.g., the direction D1) of the electrode patterns EP_1 to EP_N. However, the disclosure is not limited thereto. In other embodiments that are not shown, the third alignment direction of the third alignment layer and the fourth alignment direction of the fourth alignment layer may also be perpendicular to the alignment direction of the electrode patterns of the first electrode layer.

The second liquid crystal layer LCL2 is sandwiched between the third alignment layer AL3 and the fourth alignment layer AL4. A phase retardation of the second liquid crystal layer LCL2 may range from 0.45 μm to 4.75 μm. In other embodiment, the phase retardation of the second liquid crystal layer LCL2 ranges from 0.6 μm to 4.0 μm. In other embodiment, the phase retardation of the second liquid crystal layer LCL2 ranges from 1.3 μm to 3.0 μm. In this embodiment, a material of the second liquid crystal layer LCL2 is, for example, the positive liquid crystals, but the disclosure is not limited thereto. In other embodiments, the material of the second liquid crystal layer LCL2 may also be the negative liquid crystals.

The third electrode layer EL3 is disposed between the third alignment layer AL3 and the third substrate SUB3. The fourth electrode layer EL4 is disposed between the fourth alignment layer AL4 and the fourth substrate SUB4. It should be noted that in the display area, the third electrode layer EL3 and the fourth electrode layer EL4 are each full-surface electrodes (e.g., the unpatterned electrode layers). More specifically, an orthographic projection of the first electrode layer EL1 on the first substrate SUB1 is located within respective orthographic projections of the third electrode layer EL3 and the fourth electrode layer EL4 on the first substrate SUB1.

Referring to FIGS. 8 and 10, in this embodiment, when the first liquid crystal panel 210 receives the driving signal DS1, and the display panel 100 receives the display driving signal DS_IM1 to display the first image at the same time, the phase retarder 230A receives a driving signal DS3" at the same time to enable the third electrode layer EL3 and the fourth electrode layer EL4. An electric field is generated between the enabled third electrode layer EL3 and fourth electrode layer EL4 and drives multiple liquid crystal molecules LC2 of the second liquid crystal layer LCL2 to rotate to an arrangement state corresponding to magnitude of the electric field, so as to change the phase retardation of the second liquid crystal layer LCL2 for the incident polarization light.

It should be noted that when the first liquid crystal panel 210 receives the driving signal DS2, and the display panel 100 receives the display driving signal DS_IM2 to display the second image at the same time, the phase retarder 230A still receives the driving signal DS3" at the same time to enable the third electrode layer EL3 and the fourth electrode layer EL4. That is to say, no matter in the first time interval TP1 or the second time interval TP2, the phase delayer 230A operates with the same phase retardation.

Since the driving methods of the first liquid crystal panel 210 and the display panel 100 of the display apparatus 10A in this embodiment are similar to the display apparatus 10 in FIG. 1A, relevant paragraphs of the foregoing embodiments may be referred for detailed descriptions. Therefore, the same details will not be repeated in the following.

It is particularly noted that in this embodiment, in addition to adopt the driving method of the display apparatus 10 in the foregoing embodiment (i.e., when the first liquid crystal panel 210 is enabled) to display the two-dimensional image, the display apparatus 10A may also display the two-dimensional image in a state in which both the first liquid crystal panel 210 and the second liquid crystal panel (i.e., the phase retarder 230A) are disabled, so as to achieve the effect of energy saving.

For this reason, a sum of the phase retardation of the first liquid crystal layer LCL1 of the first liquid crystal panel 210 and the phase retardation of the second liquid crystal layer LCL2 of the second liquid crystal panel is an odd multiple of λ/2, where λ is a wavelength of a light LB passing through the two liquid crystal panels. Referring to FIGS. 8 and 9, the light LB from the display panel 100 has a first polarization direction P1 perpendicular to the first absorption axis AX1 after passing through the first polarizer POLL. When the light LB having the first polarization direction P1 passes through the phase retarder 230A and the first liquid crystal panel 210 with the sum of the phase retardation of the odd multiple of λ/2, the first polarization direction P1 is transformed into a second polarization direction P2. Since the second polarization direction P2 is perpendicular to the second absorption axis AX2 of the second polarizer POL2, the light LB may exit the display apparatus 10A through the second polarizer POL2 with the lowest light energy loss.

In particular, the disabled viewing angle control module 200A may not only save the energy, but also improve the display brightness when the display apparatus 10A displays the two-dimensional image. Since each of the display pixels of the display panel 100 may be seen by the two eyes of the user at the same time, the brightness of the displayed two-dimensional image is twice the brightness of the two-dimensional image displayed by the display apparatus 10A when the viewing angle control module 200A is enabled (or the display apparatus 10 in FIG. 1A when the viewing angle control module 200 is enabled).

Figure 11:
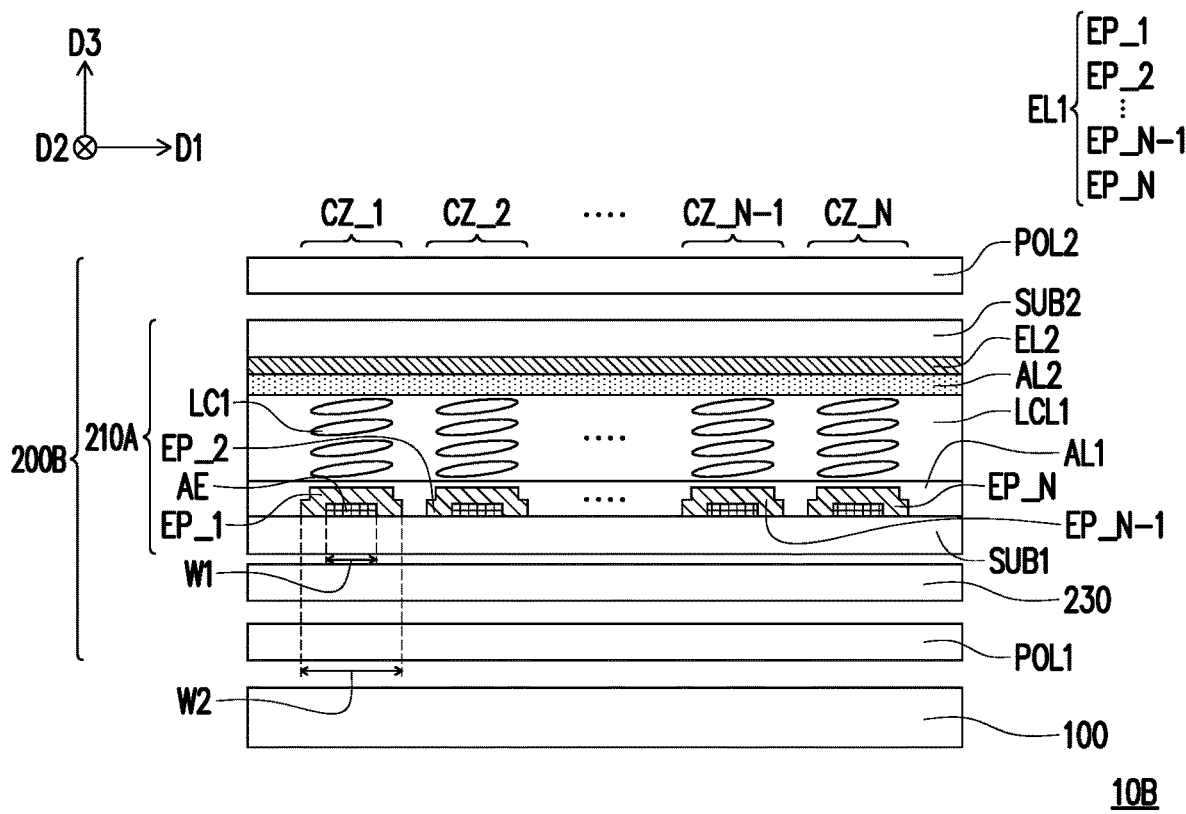
FIG. 11 is a schematic cross-sectional view of a display apparatus according to a third embodiment of the disclosure.

FIG. 11 is a schematic cross-sectional view of a display apparatus according to a third embodiment of the disclosure. Referring to FIG. 11, a difference between a display apparatus 10B in this embodiment and the display apparatus 10 in FIG. 1A is that a first liquid crystal panel 210A of a viewing angle control module 200B of the display apparatus 10B in this embodiment may optionally include multiple auxiliary electrodes AE. The auxiliary electrodes AE are overlapped with the electrode patterns of the first electrode layer EL1 respectively, and are in electrical contact with the electrode patterns.

Since orthographic projections of the electrode patterns of the first electrode layer EL1 on the first substrate SUB1 is are long strips (as shown in FIG. 2), in order to reduce voltage drop effect of the electrode patterns on an extension path, the auxiliary electrodes AE may be formed by a material with higher conductivity than that of the electrode patterns, such as metals, alloys, nitrides of metal materials, oxides of metal materials, oxynitrides of metal materials, other suitable materials, or stack layers of metal materials and other conductive materials. For example, in this embodiment, a metal material with high conductivity may be used to manufacture the auxiliary electrodes AE. Since the metal materials are mostly opaque, in order to increase stealthiness of the auxiliary electrodes AE, a width W1 of the auxiliary electrode AE along an arrangement direction (e.g. a direction Z1) of the electrode patterns may be less than a width W2 of the electrode pattern along the arrangement direction.

Based on the above, in the display apparatus according to the embodiment of the disclosure, the viewing angle control module may use the electrode patterns arranged along the direction to individually control the viewing angle of light adapted to block the zones defined by the electrode patterns, so as to generate a specific field of view. The effect of stereoscopic display is achieved by switching the field of view in the time sequence. In addition to using the full resolution of the display panel to present the stereoscopic image, there is no need to perform the alignment of pixel-size level in the process of assembling the viewing angle control module and the display panel, thereby improving the process flexibility of the display apparatus.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A viewing angle control module, comprising:
    a first liquid crystal panel, comprising
        a first substrate and a second substrate overlapped with each other;
        a first alignment layer disposed on the first substrate and having a first alignment direction;
        a second alignment layer disposed on the second substrate and having a second alignment direction, wherein the second alignment direction is antiparallel to the first alignment direction;
        a first liquid crystal layer sandwiched between the first alignment layer and the second alignment layer;
        a first electrode layer disposed between the first alignment layer and the first substrate, wherein the first electrode layer has a plurality of electrode patterns, the electrode patterns are arranged at intervals along a first direction and extend along a second direction, and the second direction intersects the first direction; and
        a second electrode layer disposed between the second alignment layer and the second substrate;
    a first polarizer disposed on one side of the first substrate away from the first liquid crystal layer and having a first absorption axis, wherein an included angle between the first alignment direction and an axial direction of the first absorption axis is 45 degrees;
    a second polarizer disposed on one side of the second substrate away from the first liquid crystal layer and having a second absorption axis, wherein an axial direction of the second absorption axis is perpendicular to the axial direction of the first absorption axis; and
    a phase retarder disposed between the first polarizer and the first liquid crystal panel,
    wherein the phase retarder is a phase compensation film, the phase compensation film has an optical axis, and an orthographic projection of the optical axis of the phase compensation film on the first substrate is parallel to the first direction.

2. The viewing angle control module according to claim 1, wherein a phase retardation of the phase compensation film ranges from 0.45 μm to 4.75 μm, and an included angle between an axial direction of the optical axis of the phase compensation film and a film surface of the phase compensation film facing the first polarizer ranges from 26 degrees to 36 degrees.

3. The viewing angle control module according to claim 1, wherein a phase retardation of the phase compensation film ranges from 0.6 μm to 4.0 μm, and an included angle between an axial direction of the optical axis of the phase compensation film and a film surface of the phase compensation film facing the first polarizer ranges from 29 degrees to 33 degrees.

4. The viewing angle control module according to claim 1, wherein a phase retardation of the phase compensation film ranges from 1.3 μm to 3.0 μm.

5. A display apparatus, comprising:

a display panel;

a viewing angle control module disposed on one side of a display surface of the display panel, and comprising a first liquid crystal panel, comprising:

a first substrate and a second substrate overlapped with each other;

a first alignment layer disposed on the first substrate and having a first alignment direction;

a second alignment layer disposed on the second substrate and having a second alignment direction, wherein the second alignment direction is antiparallel to the first alignment direction;

a first liquid crystal layer sandwiched between the first alignment layer and the second alignment layer;

a first electrode layer disposed between the first alignment layer and the first substrate, wherein the first electrode layer has a plurality of electrode patterns, the electrode patterns are arranged at intervals along a first direction and extend along a second direction, and the second direction intersects the first direction; and a second electrode layer disposed between the second alignment layer and the second substrate;

a first polarizer disposed on one side of the first substrate away from the first liquid crystal layer and having a first absorption axis, wherein an included angle between the first alignment direction and an axial direction of the first absorption axis is 45 degrees;

a second polarizer disposed on one side of the second substrate away from the first liquid crystal layer and having a second absorption axis, wherein an axial direction of the second absorption axis is perpendicular to the axial direction of the first absorption axis; and a phase retarder disposed between the first polarizer and the first liquid crystal panel;

a control unit electrically coupled to the display panel and the viewing angle control module, wherein the control unit is configured for: when the control unit provides a first driving signal to any one of the electrode patterns of the first electrode layer, and the display panel displays a first image at the same time, a viewing angle control zone defined by any one of the electrode patterns is adapted to allow a first viewing angle light from the display panel to pass through and block a second viewing angle light from the display panel, wherein when the control unit provides a second driving signal to any one of the electrode patterns, and the display panel displays a second image at the same time, the viewing angle control zone defined by the any one of the electrode patterns is adapted to allow the second viewing angle light from the display panel to pass through and block the first viewing angle light from the display panel, wherein the first driving signal is different from the second driving signal, wherein the phase retarder is a phase compensation film, the phase compensation film has an optical axis, an orthographic projection of the optical axis of the phase compensation film on the first substrate is parallel to the first direction, and the first image is the same as the second image.

6. A display apparatus, comprising:

a display panel; and a viewing angle control module disposed on one side of a display surface of the display panel, and comprising a first liquid crystal panel, comprising:

a first substrate and a second substrate overlapped with each other;

a first alignment layer disposed on the first substrate and having a first alignment direction;

a second alignment layer disposed on the second substrate and having a second alignment direction, wherein the second alignment direction is antiparallel to the first alignment direction;

a first liquid crystal layer sandwiched between the first alignment layer and the second alignment layer;

a first electrode layer disposed between the first alignment layer and the first substrate, wherein the first electrode layer has a plurality of electrode patterns, the electrode patterns are arranged at intervals along a first direction and extend along a second direction, and the second direction intersects the first direction; and a second electrode layer disposed between the second alignment layer and the second substrate;

a first polarizer disposed on one side of the first substrate away from the first liquid crystal layer and having a first absorption axis, wherein an included angle between the first alignment direction and an axial direction of the first absorption axis is 45 degrees;

a second polarizer disposed on one side of the second substrate away from the first liquid crystal layer and having a second absorption axis, wherein an axial direction of the second absorption axis is perpendicular to the axial direction of the first absorption axis; and a phase retarder disposed between the first polarizer and the first liquid crystal panel, wherein the phase retarder is a phase compensation film, the phase compensation film has an optical axis, and an orthographic projection of the optical axis of the phase compensation film on the first substrate is parallel to the first direction.

* * * * *